(12) United States Patent
Slothouber et al.

(10) Patent No.: US 9,635,410 B2
(45) Date of Patent: Apr. 25, 2017

(54) SYSTEMS AND METHODS FOR PROVIDING COMPANION SERVICES TO CUSTOMER EQUIPMENT USING AN IP-BASED INFRASTRUCTURE

(75) Inventors: Louis P. Slothouber, Leesburg, VA (US); Aaron Ye, Ashburn, VA (US); Jeffrey W. Johnston, Charlottesville, VA (US)

(73) Assignee: FOURTHWALL MEDIA, INC., Dulles, VA (US)

( * ) Notice: Subject to any disclaimer, the term of this patent is extended or adjusted under 35 U.S.C. 154(b) by 0 days.

(21) Appl. No.: 13/271,750

(22) Filed: Oct. 12, 2011

(65) Prior Publication Data

US 2012/0096503 A1    Apr. 19, 2012

Related U.S. Application Data

(60) Provisional application No. 61/393,180, filed on Oct. 14, 2010.

(51) Int. Cl.
| | | |
|---|---|---|
| *H04N 7/18* | (2006.01) | |
| *H04N 21/41* | (2011.01) | |
| *H04N 21/4722* | (2011.01) | |
| *H04L 29/08* | (2006.01) | |
| *H04L 12/28* | (2006.01) | |

(Continued)

(52) U.S. Cl.
CPC ..... *H04N 21/4126* (2013.01); *H04L 12/2818* (2013.01); *H04L 12/2834* (2013.01); *H04L 67/025* (2013.01); *H04N 21/4722* (2013.01); *H04L 2012/2849* (2013.01); *H04N 21/42207* (2013.01); *H04N 21/4758* (2013.01)

(58) Field of Classification Search
CPC .............. H04N 21/4622; H04N 21/4782
USPC .................................. 370/401; 725/80
See application file for complete search history.

(56) References Cited

U.S. PATENT DOCUMENTS

| | | |
|---|---|---|
| 7,437,150 B1 | 10/2008 | Morelli et al. |
| 2004/0117480 A1 | 6/2004 | Karaoguz et al. |
| 2006/0107299 A1 | 5/2006 | Bartfeld et al. |

(Continued)

FOREIGN PATENT DOCUMENTS

| | | |
|---|---|---|
| EP | 1 394 986 | 3/2004 |
| JP | 2002-524935 | 8/2002 |

(Continued)

OTHER PUBLICATIONS

International Search Report with Written Report from PCT/US2011/055946; Jan. 30, 2012.

(Continued)

*Primary Examiner* — Michael Hong
(74) *Attorney, Agent, or Firm* — Hunton & Williams LLP

(57) ABSTRACT

Disclosed herein are systems and methods for providing companion services to customer premises equipment (CPE) using an IP-based service infrastructure. The infrastructure allows IP-enabled devices such as tablet PCs, smart phones, PDAs, and laptop computers to provide supplementary services to target systems and devices located at customer premises. Target systems and devices (CPE) may be TVs, PCs, set-top boxes, digital video recorders, or other electronics. An embodiment is disclosed which allows a mobile device to provide companion services to a television through a link with a set-top box in a cable TV network using the Internet.

29 Claims, 10 Drawing Sheets

(51) Int. Cl.
*H04N 21/422* (2011.01)
*H04N 21/475* (2011.01)

(56) References Cited

U.S. PATENT DOCUMENTS

| | | | |
|---|---|---|---|
| 2006/0184989 A1* | 8/2006 | Slothouber | 725/110 |
| 2007/0211734 A1* | 9/2007 | Yang et al. | 370/401 |
| 2008/0205419 A1 | 8/2008 | Shin et al. | |
| 2008/0276279 A1 | 11/2008 | Gossweiler et al. | |
| 2009/0063983 A1* | 3/2009 | Amidon et al. | 715/733 |
| 2009/0066534 A1 | 3/2009 | Sivakkolundhu | |
| 2009/0100176 A1* | 4/2009 | Hicks et al. | 709/224 |
| 2009/0298535 A1* | 12/2009 | Klein | H04N 21/43615 455/556.1 |
| 2009/0325491 A1* | 12/2009 | Bell | H04L 12/66 455/41.3 |
| 2010/0159893 A1* | 6/2010 | Baldwin | H04M 11/085 455/413 |
| 2011/0138417 A1* | 6/2011 | Klappert | H04N 21/431 725/40 |

FOREIGN PATENT DOCUMENTS

| | | |
|---|---|---|
| JP | 2003-30072 | 1/2003 |
| JP | 2010-41508 | 2/2010 |
| JP | 2010-532519 | 10/2010 |
| WO | WO 2009005760 | 1/2009 |

OTHER PUBLICATIONS

Extended European Search Report from corresponding EP Application No. 11833324.4 dated Dec. 9, 2014.
Japanese Office Action corresponding to JP Application No. 2013-533969 dated Aug. 12, 2015.
Japanese Office Action corresponding to JP Application No. 2013-533969 dated May 24, 2016.

* cited by examiner

SYSTEMS AND METHODS FOR PROVIDING COMPANION SERVICES TO CUSTOMER EQUIPMENT USING AN IP-BASED INFRASTRUCTURE

CROSS REFERENCE TO RELATED APPLICATIONS

This application claims priority to U.S. Provisional Application Ser. No. 61/393,180 filed Oct. 14, 2010 entitled "Systems and Methods for Providing Companion Services to Customer Premises Equipment Using an IP-Based Infrastructure," which is incorporated by reference herein in its entirety.

FIELD OF THE INVENTION

The invention relates generally to systems and methods for providing companion services to customer premises equipment using an IP-based service infrastructure and relates particularly to providing companion services for television applications.

BACKGROUND

The increasing pervasiveness of "smart," processor-controlled devices, ranging from mobile devices such as tablet PCs, smart phones, personal digital assistants (PDAs), and laptop computers to televisions, set-top boxes (STBs), digital video recorders (DVRs), and stereos to home security systems, household appliances, utility metering and control systems, industrial controllers, vending machines, remote-controlled vehicles, and robots, together with the increasing ease and cost effectiveness of connecting such devices over a computer network, is contributing to a rising interest in leveraging capabilities of different devices to provide enhanced services and user experiences.

Dedicated, short range, wireless control of TV set-top boxes, home entertainment systems, garage door openers, and other devices using infrared or radio frequency transmitters and receivers is often supplemented by other mechanisms, such as Bluetooth, to provide higher bandwidth short range control and data transmission. Devices and systems such as utility meters, home controllers, digital still and video cameras, robots, medical systems, and industrial machine controllers may be enabled for monitoring and control via the Internet, using, for example, WiFi and 3G links. Such enablement is generally provided by including web server functionality in the device being controlled and web browser functionality in the remote controlling device. Remote control of vehicles, medical systems and devices, and remote presence systems often utilize proprietary as well as non-proprietary communications links. In the home entertainment arena, products are available to provide users with remote access to and control over audio-visual equipment (e.g., STBs, DVRs) via devices which utilize the equipment's external remote control interfaces and include the ability to stream captured video to other devices inside and outside the home.

The current arts have yet to provide effective means for leveraging the functionality of various devices to provide enhanced services and user experiences. Current systems are limited by controller devices which may become quickly outdated and are cumbersome to use. These systems are also limited by an inability to share content and functions between devices. In the TV and multimedia domain, content providers and programmers have difficulty delivering integrated, multi-screen experiences to consumers while also taking full advantage of the improving capabilities of these devices. Current arts also suffer from complicated device linking (a.k.a. "pairing") procedures; insecure data transmission; difficulty supporting multiple device platforms; limited access to remote system functionality (e.g., emulation of local remote control only or access to a subset of such functions); need for dedicated hardware to be externally coupled to device or system being controlled; difficulty supporting target systems from different vendors; and difficulty producing a critical mass of reliable applications due to lack of robust, certified interfaces and middleware.

SUMMARY OF THE INVENTION

The present invention is intended to overcome the aforementioned deficiencies and enable provision of companion services to customer premises equipment (CPE) using an IP (Internet Protocol)-based service infrastructure.

In one embodiment, the present invention may provide a gateway server communicatively coupled to an IP-enabled device via an IP network. The gateway server may provide web services to a companion application running on the IP-enabled device. The web services define a set of functions that can be executed on target CPE. These functions are supported by a companion application client running on the CPE by providing access to certain software and hardware functionality of the CPE. In addition to web services, the gateway server may provide network management services that pair and un-pair the IP-enabled device with the appropriate target CPE. The gateway server may also authenticate devices, manage network resources, and execute secure transmission of messages between the IP-enabled device and the target CPE. Further, the gateway server may provide a message routing and relay function which may route messages to one or more distribution and routing servers which cooperatively provide a path through the IP network for delivering messages between the paired devices. An exemplary path may be a hierarchy with the gateway server positioned at the root node, message routing and relay services provided at intermediate nodes, and participating CPE devices located at leafs.

In another embodiment, the gateway server may be a centralized server providing enhanced television (ETV) services. The IP network may be provided, in part, by a multiple services operator like a cable or telecommunications company. The gateway server may be communicatively coupled to one or more ETV platform servers running message routing and relay services over a hybrid fiber-coax (HFC) distribution network. The target CPE device may be a set-top box, advanced television, or any other like device. The CPE devices may each run a companion application client implemented using the enhanced TV binary interchange format (EBIF) standard which is executed by an EBIF user agent (UA). This set-top box configuration may allow paired IP-enabled devices to execute set-top box functions such as channel changes, querying the current set-top box state, DVR recording controls, text and graphic display on the associated television screen, and presentation of interactive dialogs on the TV.

In another embodiment, the pairing of an IP-enabled device and target CPE may be accomplished using PINs, device tokens, and IP addresses appropriately communicated and cooperatively processed by IP-enabled devices, a gateway server, distribution and routing servers, and target CPE.

In another embodiment, a mechanism may be provided to assure that only certain companion application will run in systems according to the present invention.

In another embodiment, the IP network may be the Internet or an intranet.

In another embodiment, the IP network may be a satellite or broadcast TV network.

In another embodiment, the target CPE may be a device such as a stereo, home security system, home appliance, utility metering or control device, industrial controller, vending machine, remote-controlled vehicle, or robot.

Benefits of the present invention may include: (a) Simple, secure pairing, routing, and authentication of traffic between IP-enabled devices and target CPE, (b) Ability for applications running on IP-enabled devices (e.g., iPad/iPhone, Android, Windows Mobile) to control any function exposed on a target CPE, (c) Support for functionality provided by the IP-enabled device that is not provided by the target CPE's default controllers (e.g., keyboard, additional display screen, Internet access, click wheel, touch screen, microphone, camera) enabling users to achieve a much richer, more productive, multi-screen experience, (d) Elimination of need for additional, external hardware to control the target CPE (e.g., IR-blaster dongles), (e) Ability for IP-enabled devices to control target CPE from any manufacturer that include suitable enabling software (e.g., EBIF User Agent and companion application client EBIF application in the Enhanced Television domain), and (f) Greater ease in providing reliable applications on IP-enabled devices due to enforcement of resource constraints and other controls built into the enabling system components, thus allowing applications to be developed and provided with less risk to network service providers (e.g., cable companies, telecommunication companies, and other multiple services operators).

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
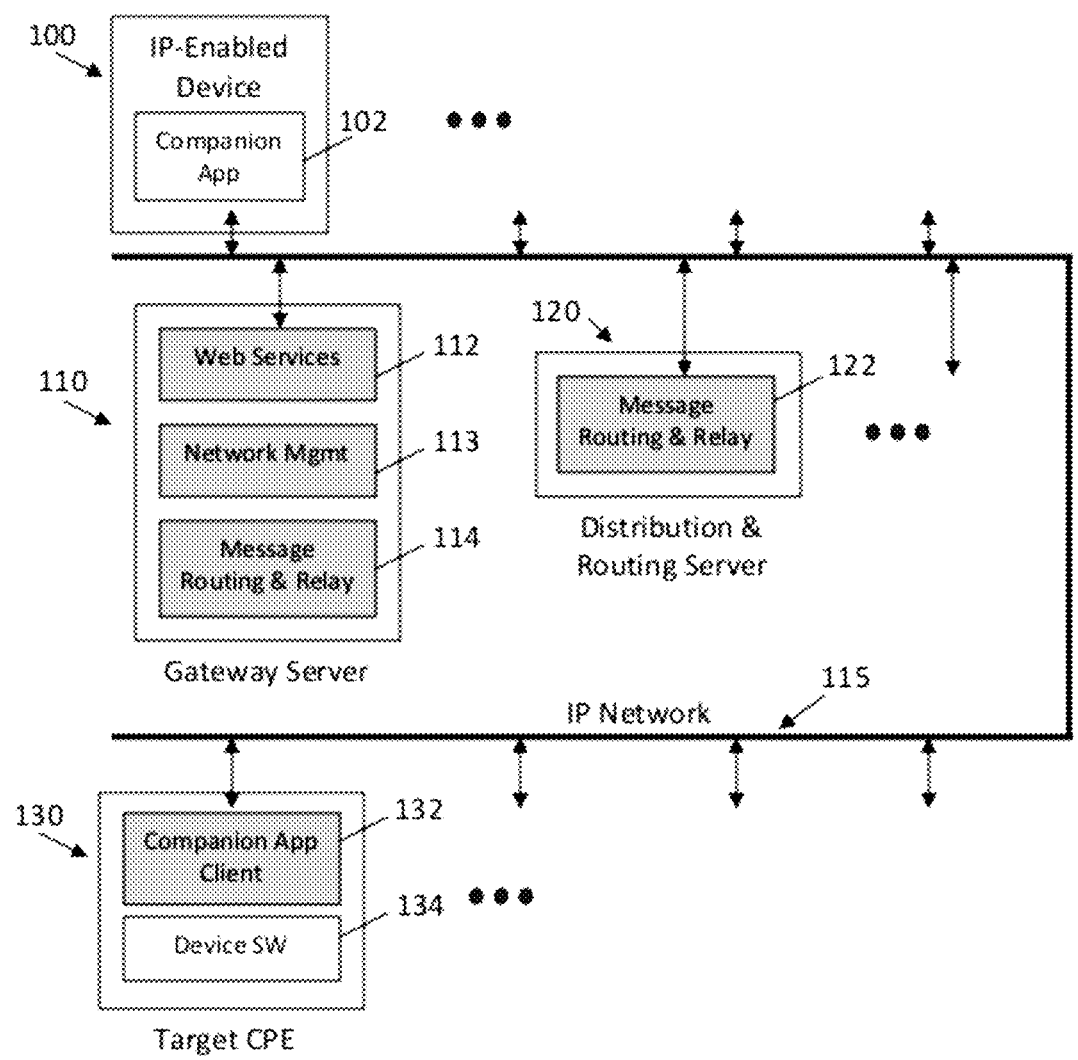
FIG. 1 is a diagram depicting an exemplary embodiment of a system for providing companion services to CPE using an IP-based service infrastructure.

FIG. 1 depicts a system for providing companion services to CPE using an IP-based service infrastructure according to an exemplary embodiment of the present invention. Companion services are services that may supplement the capabilities of a target CPE to enhance the effectiveness and/or enjoyment of users interacting with the CPE. Companion services may utilize capabilities of IP-enabled devices that are not provided by the hardware and software provided with the target CPE. The key infrastructure components provided by the present invention may be those highlighted in gray in FIG. 1 (112, 113, 114, 122, 132).

As depicted in FIG. 1, the invention may provide a gateway server 110 communicatively coupled to an IP-enabled device 100 via an IP network 115. The gateway server 110 may provide web services 112 to companion applications 102 running on multiple IP-enabled devices 100. The web services 112 define a set of functions that may be executed on target CPE 130. These functions are supported by a companion application client 132 running on device software 134 which may be provided on the target CPE 130 by providing access to certain software and hardware functionality of the CPE 130.

IP-enabled devices 100 may be devices such as tablet PCs (e.g., Apple iPad®), smart phones (e.g., Apple iPhone®, Samsung Galaxy S™, Droid), PDAs (e.g., Palm, BlackBerry®), and laptop computers. By using web services 112, companion applications 102 may readily be developed to run on virtually any IP-enabled device 100 operating system (e.g., iPad OS, Android, Windows Mobile). The IP-enabled device 100 and companion application 102 may also utilize other services provided via the IP network 115 to enhance their functionality (not shown).

In addition to web services 112, the gateway server 110 may provide network management services 113 that pair and un-pair the IP-enabled device 100 with the appropriate target CPE 130, authenticate devices and messages, manage network resources, and execute secure transmission of messages between the IP-enabled device 100 and the target CPE 130. The gateway server 110 may also provide a message routing and relay function 114 which may route messages to one or more distribution and routing servers 120. The one or more distribution and routing servers 120 may cooperatively provide a path through the IP network 115 for delivering data and messages between the paired devices (100 and 130) by using message relay and routing services 122 provided by the distribution and routing servers 120. This exemplary path may be a hierarchy with the gateway server 110 positioned at the root node, message routing and relay services 122 provided at intermediate nodes, and participating target CPE 130 located at leafs. The gateway server 110 may also provide for data collection which may be used for measuring, analyzing, and reporting on user actions and system status and activities.

Distribution and routing servers 120 need not be homogeneous, rather they may be implemented differently and provide functions beyond the basic message routing and relay services 122 as appropriate to where they exist in the network.

In addition to executing web services on target CPE 130, the companion application client 132 may participate in the pairing and un-pairing of, and secure communication between, the target CPE 130 and the IP-enabled device 100 to provide web services exposed on the target CPE 130.

Figure 2:
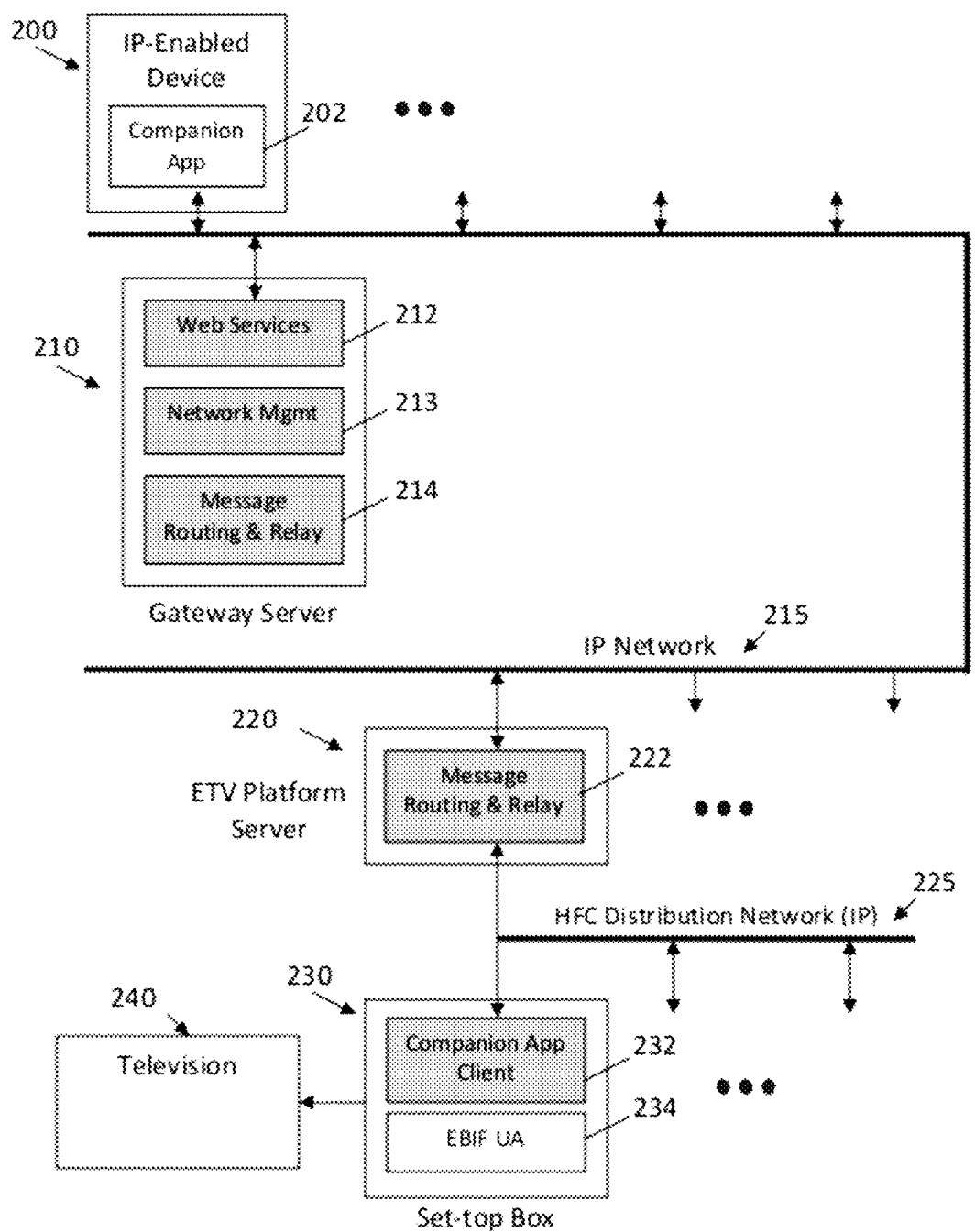
FIG. 2 is a diagram depicting an exemplary embodiment of a system which uses an IP-enabled device to provide companion services through a link with a set-top box in a cable TV network.

FIG. 2 depicts an exemplary embodiment of a system which may use an IP-enabled device 200 to provide companion services through a link with a set-top box 230 according to an exemplary embodiment of the present invention. As depicted in FIG. 2, a gateway server 210 may be communicatively coupled to an IP-enabled device 200 via an IP network 215, which may optionally include the Internet. The gateway server 210 may be a centralized server providing enhanced television (ETV) services in a cable TV network and may include the provision of web services 212 to companion applications 202 running on multiple IP-enabled devices 200. The web services 212 may define a set of functions that may be executed on target set-top boxes 230. These functions may be supported by a companion application client 232 which may be implemented using the enhanced TV binary interchange format (EBIF) standard and executed by an EBIF user agent (UA) 234 running on the set-top box 230. The companion application client 232 may provide access to certain software and hardware functionality of the set-top box 230, mapping the web services 212 to executable functions on the set-top box 230.

The gateway server 210 may be communicatively coupled to one or more ETV platform servers 220 running message routing and relay services 222 to route messages using Internet Protocol (IP) over a hybrid fiber-coax (HFC) distribution network 225 to appropriate paired set-top boxes 230. This set-top box 230 configuration may allow paired IP-enabled devices 200 to execute set-top box functions such as channel changes, querying the current set-top box state, DVR recording controls, text and graphic display on the associated television screen 240, and presentation of interactive dialogs on the TV 240.

IP-enabled devices 200 may be mobile devices such as tablet PCs (e.g., Apple iPad®), smart phones (e.g., Apple iPhone®, Samsung Galaxy S™, Droid), PDAs (e.g., Palm, BlackBerry®), and laptop computers. By using web services 212, companion applications 202 may be easily developed to run on any IP-enabled device 200 operating system (e.g., iPad OS, Android, Windows Mobile). The IP-enabled device 200 and companion application 202 may also utilize other services provided via the IP network 215 to enhance their functionality. For example, a voting and polling application (not shown) may communicate with an application server (not shown) that may be attached to the IP network 215 to aggregate and report on votes that are received from all or some of the IP-enabled devices 200 that may be running the voting and polling application. Results sent to the IP-enabled device 200 may then be sent to each paired set-top box 230 to affect a function, such as presenting voting or polling results in a pleasing way on the television 240.

In addition to web services 212, the gateway server 210 may provide network management services 213 that pair and un-pair the IP-enabled device 200 with the appropriate set-top box 230, authenticate the devices, manage network resources, and execute secure transmission of messages between the IP-enabled device 200 and the set-top box 230. The gateway server 210 may also provide a message routing and relay function 214 which may route messages to one or more ETV platform servers 220 which may cooperatively provide a path through the IP network 215 for delivering data and messages between the paired devices (200 and 230), which may be affected using message relay and routing services 222 provided by the ETV platform servers 220.

Building the companion application client 232 on the EBIF infrastructure provides several benefits. Because the EBIF infrastructure is already deployed by cable operators, speed to market may be improved by reducing or eliminating the need to test each and every TV companion service operating through the client 232. All set-top box 230 and network resources (215, 220, 225), including bandwidth, may be protected by the infrastructure provided by the present invention, thus preventing any companion application 202 from adversely impacting a provider's system.

By pairing a more capable IP-enabled device 200 with a target set-top box 230, users may achieve significantly enhanced functionality versus using the remote control device(s) provided with the set-top box 230. For example, a remote controller provided with a set-top box may provide a large number of buttons for controlling key aspects of the television viewing experience (e.g., channel changes, volume, favorite channels, interactive program guide navigation). Most standard set-top box remote controls do not, however, include keyboard functionality, high-resolution touch display screens, Internet connectivity, or microphone or camera input. When the functions provided by a set-top box are supplemented by such enhanced capabilities provided by IP-enabled devices, a richer and more pleasing experience is available to the viewer. Similarly, by decoupling a set-top box from the remote control device(s) provided originally with the system, other advantages are possible. For example: (a) Developers may provide entirely new ways to control a target device from that envisioned by the system provider (e.g., some set-top box users may prefer to control their TVs using an Apple iPod style click wheel, touch screen, or spoken commands input using an IP-enabled device's microphone versus the standard multi-button remotes), and (b) Users may be able to upgrade their target system by acquiring a new, enhanced, multi-function controller device which works with their existing target system hardware and software rather than replacing the system. Additionally, Enhanced TV (ETV) EBIF applications may be enhanced through additional access to cloud computing services and Internet content provided by companion applications running on IP-enabled devices.

Exemplary embodiments may provide applications running on a subscriber's Internet device with a safe and secure connection through the Internet to a subscriber's EBIF-enabled set-top box and TV screen. Using a mechanism such as that described in conjunction with FIG. 5, a web services-enabled Internet device may be linked to an EBIF-enabled set-top box. Once linked, the Internet device may cooperate with companion application client applications on the set-top box from anywhere in the world, to perform functions such as:

changing channels on the set-top box and TV;

querying the current channel, program, and state of the set-top box;

beginning immediate DVR recording on the set-top box;

scheduling future DVR recording on the set-top box;

displaying limited text and/or graphics on the TV screen over top of video;

displaying a dialog on the TV screen over video to interact with the user; and turning the set-top box on or off.

Such services may be available for any EBIF user agents on the set-top box. In conjunction with a suitably enhanced EBIF user agent according to the current invention, additional enhanced services may also be available, including:

discovery of EBIF applications available on the set-top box;

launching of EBIF applications available on the set-top box; and communication with enhanced EBIF applications available on the set-top box (e.g., upload caller-ID call logs to an iPhone).

In another exemplary embodiment, the IP network 115 is an intranet.

In another exemplary embodiment, the IP network 115 is a satellite or broadcast TV network.

In another exemplary embodiment, the IP network 115 may be provided by a multiple services operator like a cable or telecommunications company.

In another exemplary embodiment, the target CPE 130 may be a device such as a stereo, home security system, home appliance, utility metering or control device, industrial controller, vending machine, remote-controlled vehicle, or robot.

In another exemplary embodiment, the IP-enabled device 200 may be a tethered device such as a desktop PC, kiosk, and set-top box (e.g., Cisco, Motorola, Pace). Such a configuration may allow, for example, the pairing of one set-top box with another so a user can control one box using the other or allow multiple boxes to cooperate in other ways.

Figure 3:
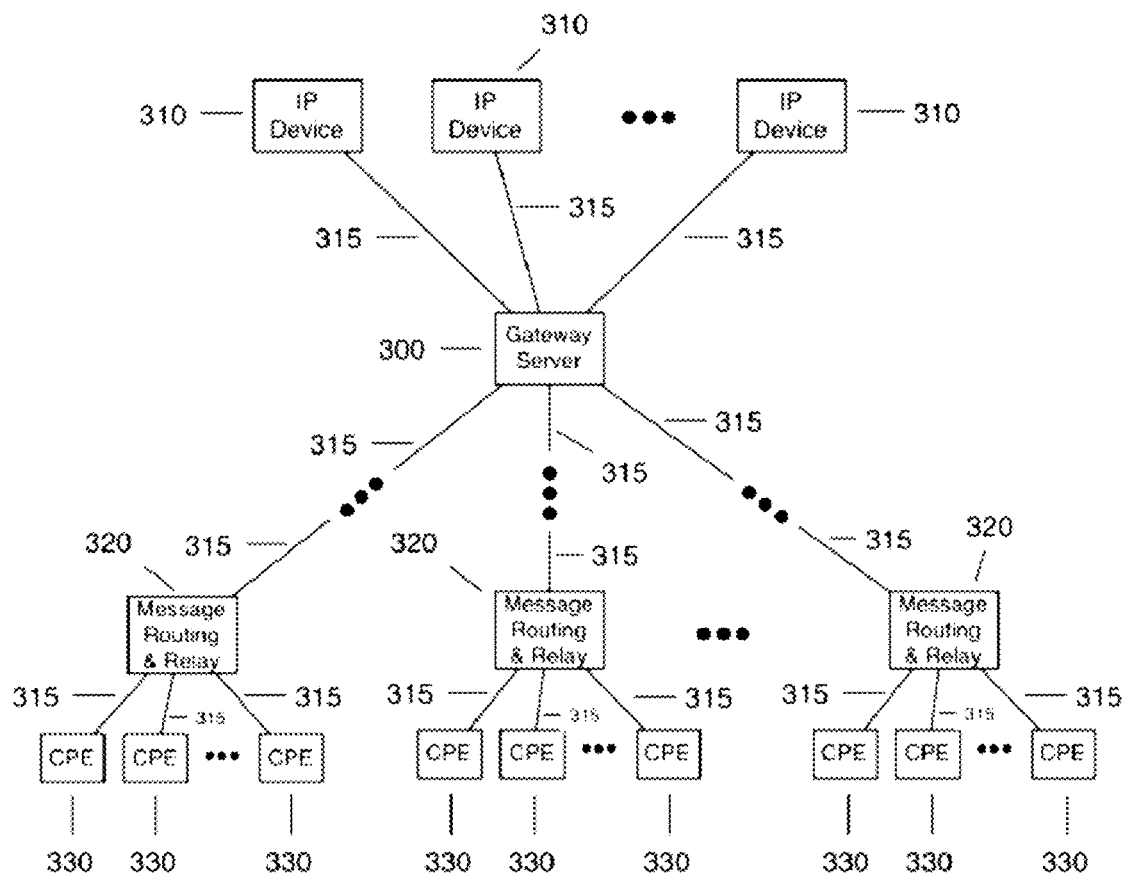
FIG. 3 is a diagram depicting an exemplary embodiment of a hierarchical network implementation.

FIG. 3 depicts a hierarchical network implementation according to an exemplary embodiment of the present invention. In such a network, multiple IP devices 310 are communicatively coupled to gateway server 300 that may be positioned at a root node, message routing and relay services 320 may be located at one or more levels of intermediate nodes, and terminal message routing and relay services 320 may be communicatively coupled to participating target CPE 330, which may be located at leafs. All nodes are connected via an IP network 315. Pairing of IP devices 310 and CPE 330, and messaging between paired devices (310 and 330), may be accomplished as described more fully below with regards to the exemplary embodiments depicted in FIGS. 5, 6a, 6b, 7a, 7b, 8a, 8b, and 8c.

Figure 4:
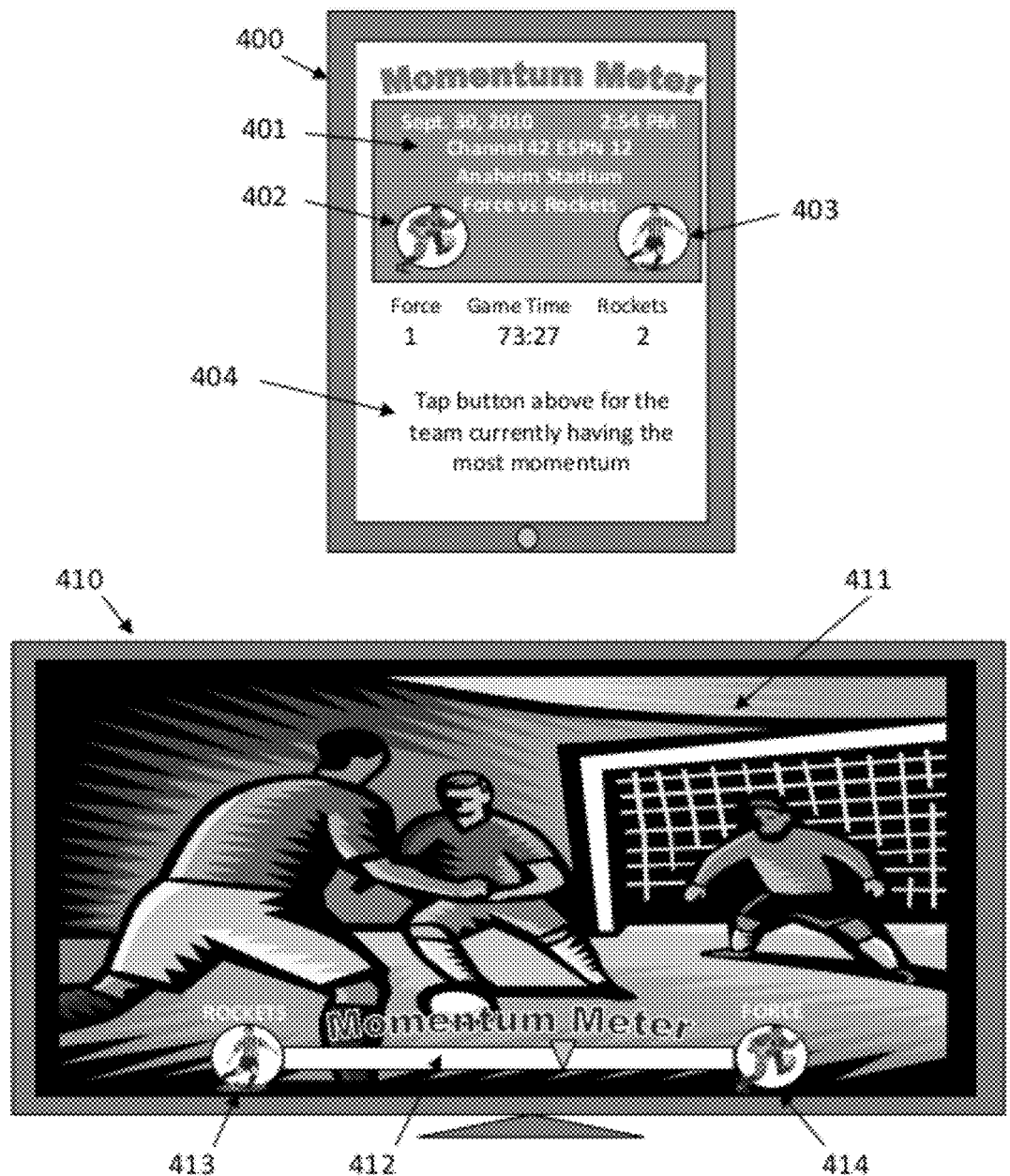
FIG. 4 is a diagram depicting an exemplary embodiment of a Momentum Meter application running on an IP-enabled device interacting with an associated television.

FIG. 4 depicts an exemplary Momentum Meter running on an IP-enabled device 400 interacting with an associated television 410. The IP-enabled device 400 may be a tablet PC that includes a touch screen overlaying a high resolution display and provides a wireless WiFi or 3G connection to the Internet. The Momentum Meter application may link the tablet PC 400 to an application server residing on the IP network 215. The application server counts "votes" from users who are running the Momentum Meter. The votes may indicate which team each user thinks has the momentum in a sporting event being broadcast over a cable TV network.

The application may display various information 401 about the game such as the date and time of the game, channel of broadcast, venue, teams playing, current score, time expired (or time remaining), team and player statistics, historical statistics, and the like.

The application may also include a text prompt 404 directing the user to tap the appropriate button to cast his or her vote. In the exemplary embodiment depicted by FIG. 4, the left button 402 indicates a vote for the "Force" and the right button 403 a vote for the "Rockets." As the user taps button 402 or 403, the votes are captured, filtered (e.g., there may be a limit on the number of votes a given user can cast in a given amount of time), and aggregated with votes from other users by the companion application 202 and associated application server. The application server may send each participating IP-enabled device 400 (200) an aggregate result indicating the momentum calculated for the respective teams. Each device 400 (200) may send that result to its respective paired set-top box 230 by means of the infrastructure and methods described by the present invention. At the set-top box 230, the aggregate momentum result may be rendered on the connected television 410 (240) using an EBIF companion application client 232 running on the set-top box 230 according to web services 112 exposed on the set-top box 230. The exposed web services 112 may include the ability to draw and interact with lines, shapes, text, or simple templated components on the screen. In the current example, a Momentum Meter graphic 412 may be rendered and displayed on a television 411 over top of the live sporting event which is being broadcast over a cable network. The graphic 412 may indicate which team has been voted as currently having the momentum in the game. FIG. 4 indicates the "Force" 414 has the momentum over the "Rockets" 413 having accrued 60-70% of the votes cast.

One of ordinary skill in the art will readily understand that the exemplary embodiment described with regard to FIG. 4 may be applied to any number of other embodiments to cast and compile real-time user votes across a network. For instance, the embodiment depicted in FIG. 4 may be applied with regard to political debates, news programs, game shows, home shopping channels, or any other type of programming.

In applications where target CPE are stereos, home security systems, household appliances, utility metering and control systems, industrial controllers, vending machines, remote-controlled vehicles, and/or robots, exemplary companion services may include: (a) Supplementing functions provided by home security systems by utilizing voice commands or touch pad functionality on an IP-device to enable security system functions and specify which video cameras or sensors feeds to display on the device, (b) Supplementing home security system functions by having an IP-device monitor police alerts available as services on the IP network and automatically place the system in a heightened state if suspicious activities are reported in the local area, (c) Supplementing functions provided by home appliance networks by monitoring inventory of products in a smart refrigerator, linking to the local grocery store web sites to find best deals for needed products, and suggesting purchases to the user on their IP-enabled device, and (d) Linking camera and microphone inputs from a remote presence robot and automatically generating robot responses based on image recognition capabilities provided by companion application running on the paired IP-enabled device.

Figure 5:
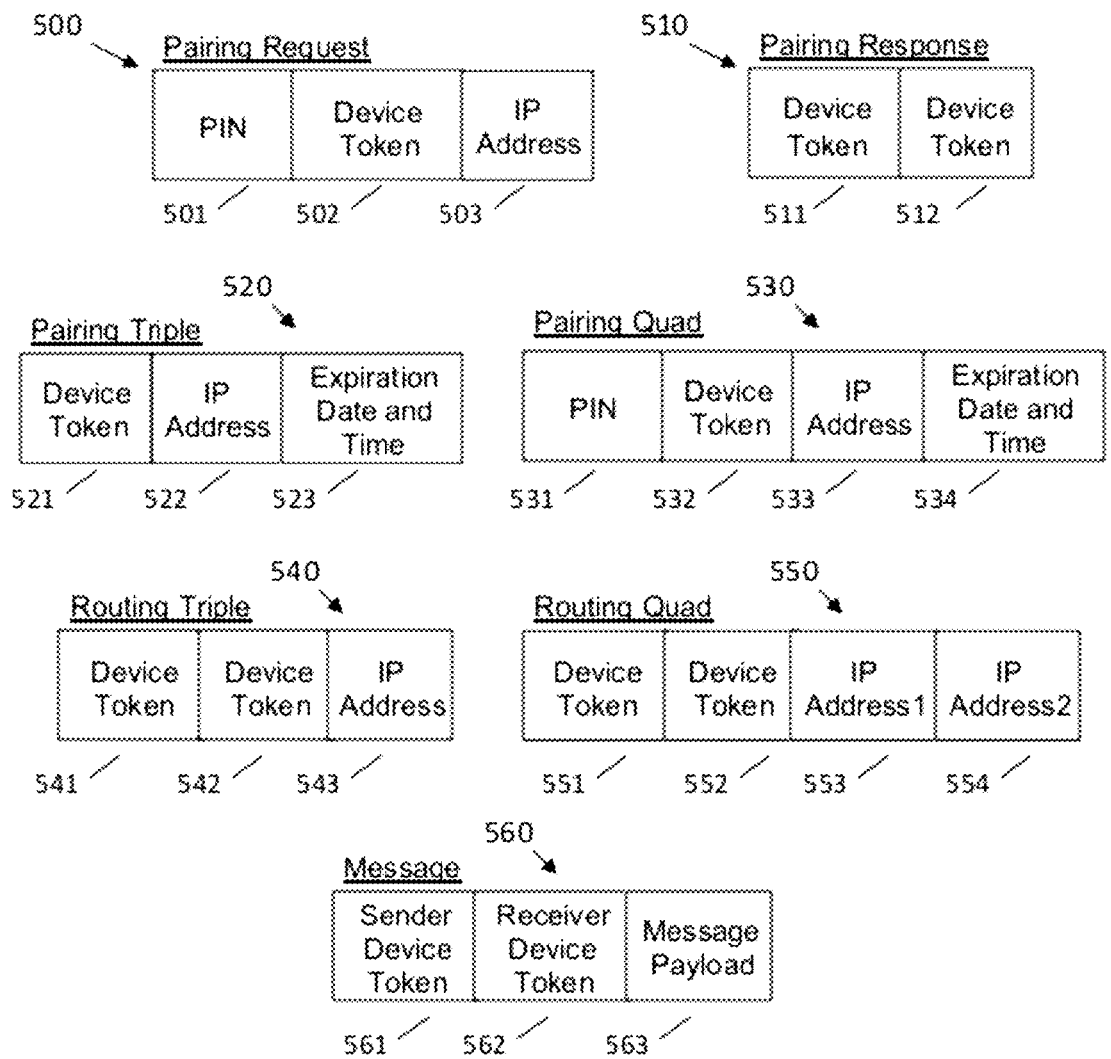
FIG. 5 is a diagram depicting an exemplary embodiment of data used when pairing a target system to an IP-enabled device and a message format for sending messages between paired devices.

The diagram in FIG. 5 depicts an exemplary embodiment of data used when pairing a target CPE to an IP-enabled device and a message format for sending messages between paired devices according to the present invention. This data is referenced and described in conjunction with the exemplary embodiments depicted in FIGS. 6a, 6b, 7a, 7b, 8a, 8b, and 8c, which describe exemplary suitable pairing and messaging operations according to the exemplary embodiments of the present invention.

Figure 6A:
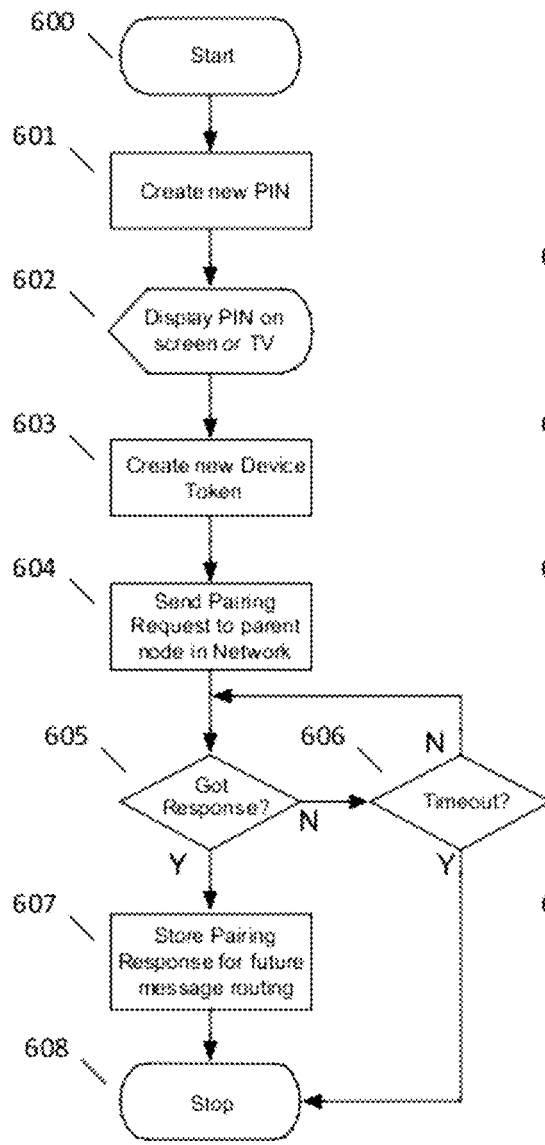
FIG. 6a is a flowchart depicting an exemplary embodiment of a process executed by a target CPE when pairing a target CPE to an IP-enabled device.

The flowchart in FIG. 6a depicts an exemplary embodiment of a process executed by a target CPE when pairing a target CPE to an IP-enabled device according to an exemplary embodiment of the present invention. The process may begin in step 600. In step 601 the companion application client on the CPE may create a new personal identification number (PIN) for initiating the device pairing process. PIN creation may be initiated on the CPE manually by using the remote control or via a similar mechanism. In an exemplary embodiment, any PIN generation mechanism may be to provide for either: (a) the creation of PINs on two CPEs that are unique during the same pairing expiration period, or (b) the rejection of duplicate PINs during message routing and relay and requiring the CPE to generate another PIN until an acceptable one is created. The created PIN may be displayed on a screen or TV associated with the CPE in step 602. Once that PIN is entered on the IP-enabled device being paired by the user, the displayed PIN may be dismissed from the screen. In step 603, the CPE may create a new globally-unique Device Token for use in the pairing transaction. The PIN 501, Device Token 502, and the device's IP Address 503 may be sent as a Pairing Request 500 to the immediate parent node in the network in step 604. In step 605, the CPE may wait for a Pairing Response 510 from the network consisting of the Device Token of the CPE 511 and a unique Device Token received from the paired IP-enabled device 512. If the response is received (i.e., step Got Response?=Y), the Pairing Response 510 may be stored in step 607 for use in future message routing, and the process stops 608. If no response is received in step 605 (Got Response?=N), the CPE may idle in a timing loop (steps 606 and 605) until either the response is received (step 607) or the loop times out (i.e., Timeout?=Y in step 606). If the loop times out, the process stops 608 and nothing is stored.

Figure 6B:
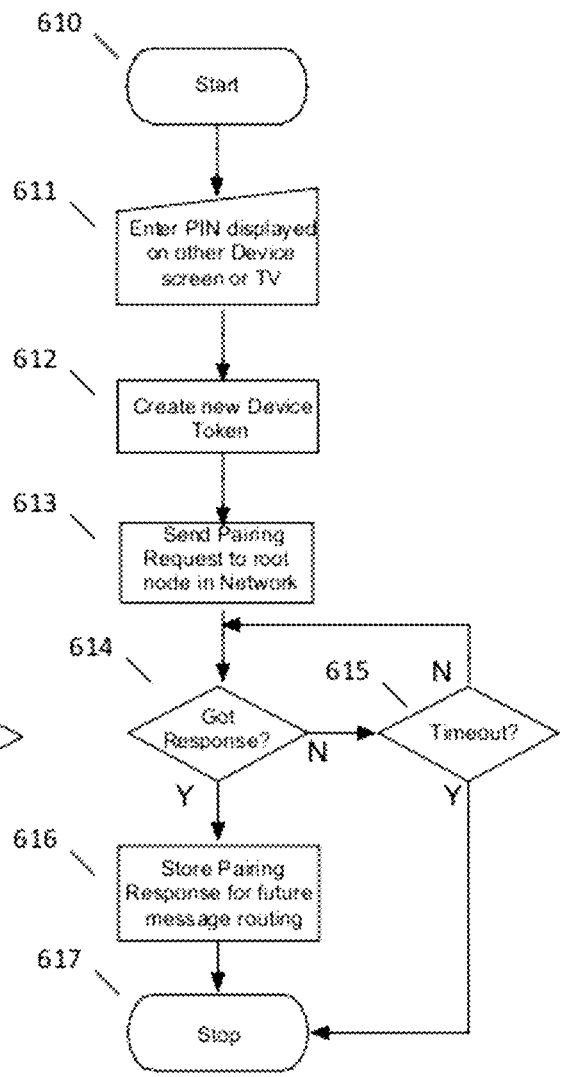
FIG. 6b is a flowchart depicting an exemplary embodiment of a process executed by an IP-enabled device when pairing a target CPE to an IP-enabled device.

The flowchart in FIG. 6b depicts a process executed by an IP-enabled device when pairing a target CPE to an IP-enabled device according to an exemplary embodiment of the present invention. The process starts in step 610. In step 611 the user enters a PIN, such as the PIN created by the CPE in the process depicted in FIG. 6a, which may be displayed on the TV screen or other CPE device screen into the IP-enabled device. In step 612 the IP-enabled device may create a new globally-unique Device Token to be used in the pairing transaction. The entered PIN 501, Device Token 502, and CPE's IP Address 503 may be sent as a Pairing Request 500 to the root node in the network (i.e., gateway server) in step 613. In step 614, the IP-enabled device may wait for a Pairing Response 510 from the network, which may consist of a Device Token, that may represent the CPE 511 being paired and the Device Token of the current IP-enabled device 512. If the response is received (i.e., step Got Response?=Y), the Pairing Response 510 may be stored in step 616 for use in future message routing, and the process stops 617. If no response is received in step 614 (Got Response?=N), the IP-enabled device may idle in a timing loop (steps 614 and 615) until either the response is received (step 616) or the loop times out (i.e., Timeout?=Y in step 615). If the loop times out, the process stops 617 and nothing is stored.

In other exemplary embodiments, the roles in pairing may be reversed from those depicted and described FIGS. 6a and 6b. That is, the IP-enabled device may create the PIN and initiate the pairing process, and the CPE may be used to enter the PIN and complete the pairing process.

Figure 7A:
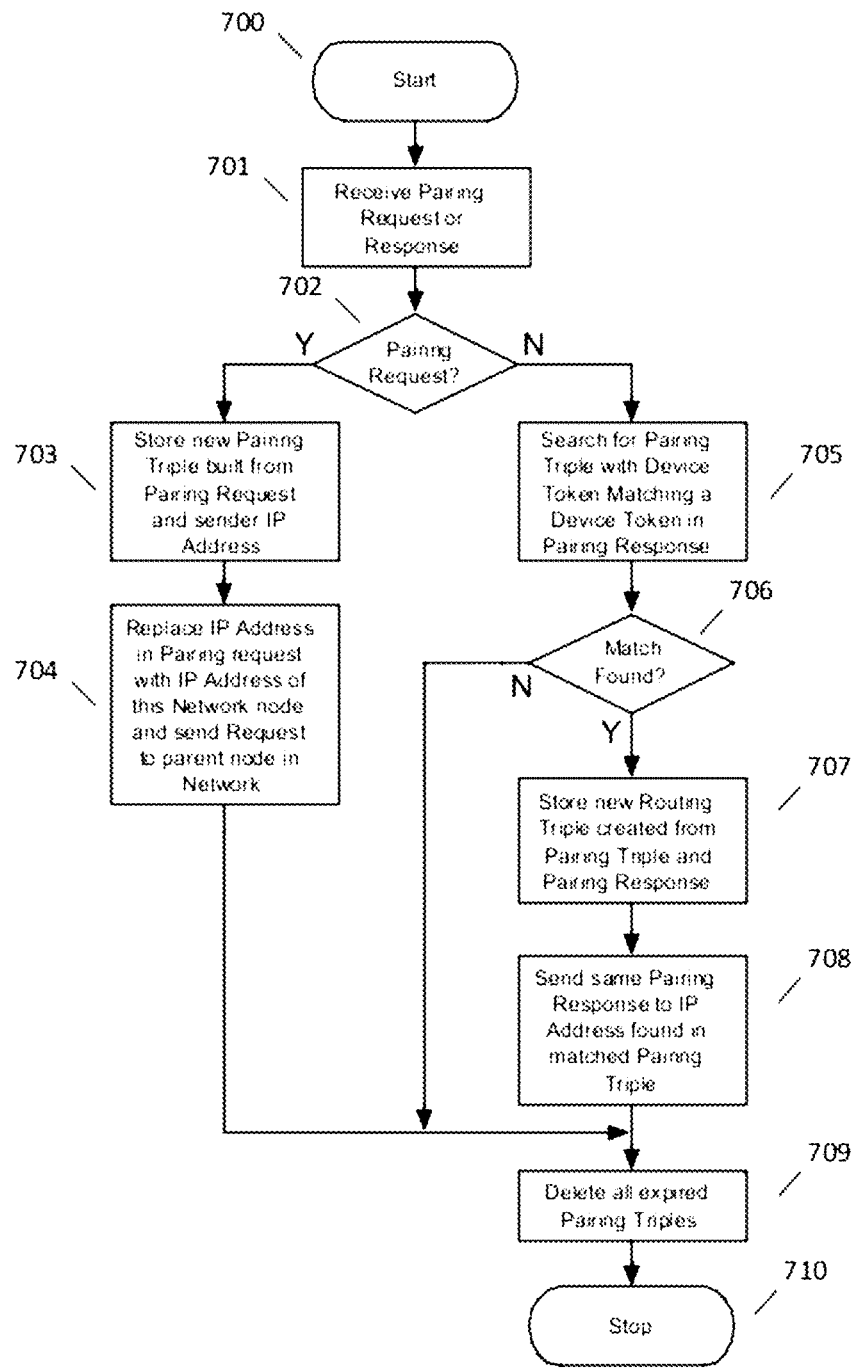
FIG. 7a is a flowchart depicting an exemplary embodiment of a process executed by a distribution and routing server when pairing a target CPE to an IP-enabled device.

The flowchart in FIG. 7a depicts a process that may be executed by a distribution and routing server when pairing a target CPE to an IP-enabled device according to an exemplary embodiment of the present invention. The process starts in step 700. In step 701 the message routing and relay service of the distribution and routing server may receive a Pairing Request 500 or Pairing Response 510 from a parent or child node in the network, such as the parent/child relationships depicted in FIG. 4. In step 702 the data received in the previous step may be evaluated for whether it is a Pairing Request 500 or a Pairing Response 510. If it is a Pairing Request 500 (Pairing Request?=Y), the process may continue with step 703 and the distribution and routing server may create and store a new Pairing Triple 520 consisting of the Device Token 521 extracted from the Pairing Request 500 (Device Token 502) together with the IP Address of the sending node 522 and an Expiration Date and Time 523. The Expiration Date and Time 523 may be defined to be the current time plus an additional time the associated data may be valid for the pairing process. The PIN and Device Tokens generated for the pairing may only be valid during this time, which may be, for example, one minute. In step 704 the distribution and routing server may replace the IP Address in the Pairing Request 500 with the IP Address of the current network node and send the resulting Pairing Request 500 to its parent node in the network. In step 709, the distribution and routing server may delete all expired Pairing Triples 520 as indicated by their Expiration Data and Time fields 523 exceeding the current date and time, and the process stops 710. If the test in step 702 indicates a Pairing Response 510 was received (Pairing Request?=N), the distribution and routing server may execute step 705, wherein it may search for a previously-stored Pairing Triple 520 with a Device Token 521 matching a Device Token (511 or 512) in the Pairing Response 510 just received. In step 706, if a match is not found (Match Found?=N), processing may continue with steps 709 and 710 described previously. If a match is found in step 706 (Match Found?=Y), processing may continue with step 707, wherein the distribution and routing server may create and store a new Routing Triple 540 created from the Pairing Triple 520 and Pairing Response 510. The Routing Triple 540 may then consist of the Device Tokens for the two devices (IP-enabled device and CPE) being paired (541 and 542) and the IP Address 543 of an adjacent routing node contained in the Pairing Triple 520. The process may continue with step 708, wherein the Pairing Response 510 used in the previous step is sent to the IP Address found in the matched pairing Triple 520. The process then may conclude with steps 709 and 710.

Figure 7B:
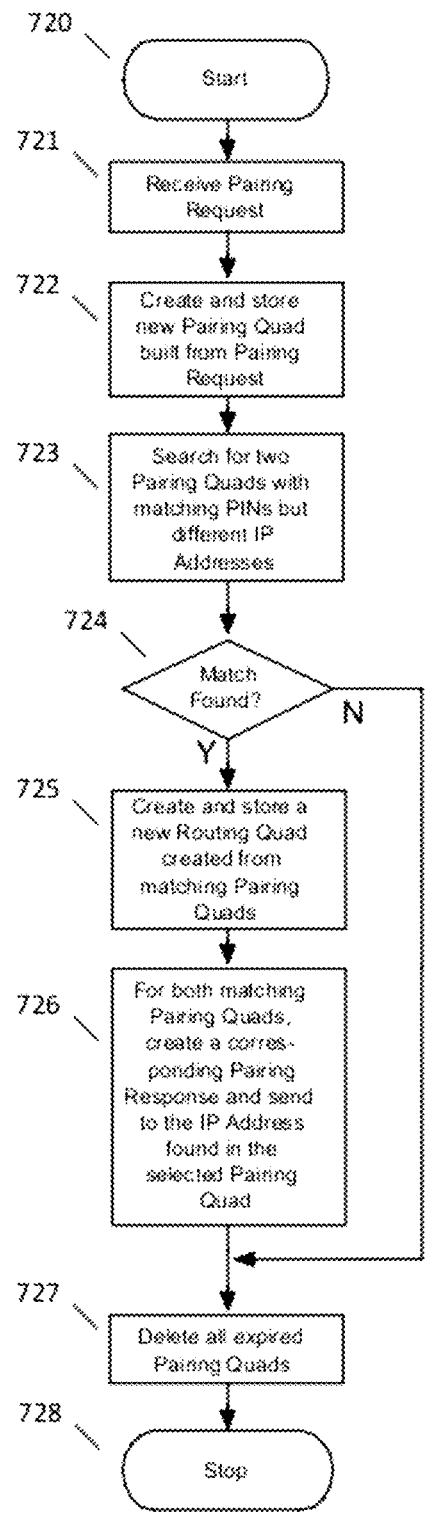
FIG. 7b is a flowchart depicting an exemplary embodiment of a process executed by a gateway server when pairing a target CPE to an IP-enabled device.

The flowchart in FIG. 7b depicts a process that may be executed by a gateway server when pairing a target CPE to an IP-enabled device according to an exemplary embodiment of the present invention. The process starts in step 720. In step 721 the gateway server may receive a Pairing Request 500 which may come from an IP-enabled device or CPE. In step 722 the gateway server may create and store a new Pairing Quad 530 consisting of a PIN 531, Device Token 532, IP Address 533, and Expiration Data and Time 534, where the PIN 531, Device Token 532, and IP Address 533 are built from the incoming Pairing Request 500. In step 723, the gateway server may search for two stored Pairing Quads 530 with matching PINS 531 but different IP Addresses 533. As shown in step 724, if a match is found (Match Found?=Y), the process may continue with step 725 wherein the gateway server may create and store a new Routing Quad 550 consisting of Device Tokens (551 and 552) and IP Addresses (553 and 554) created from the matching Pairing Quads 530. In step 726, for both matching Pairing Quads 530, the gateway server may create a corresponding Pairing Response 510 and send it to the IP Address 533 found in the selected Pairing Quad 520. Thereafter, in step 727, all expired Pairing Quads 530 may be deleted and the process stops 728. Returning to step 724, if two Pairing Quads 530 with matching PINs but different IP Address are not found (Match Found?=N), the process may continue with steps 727 and 728 wherein all expired Pairing Quads 530 may be deleted and the process stops.

Figure 8A:
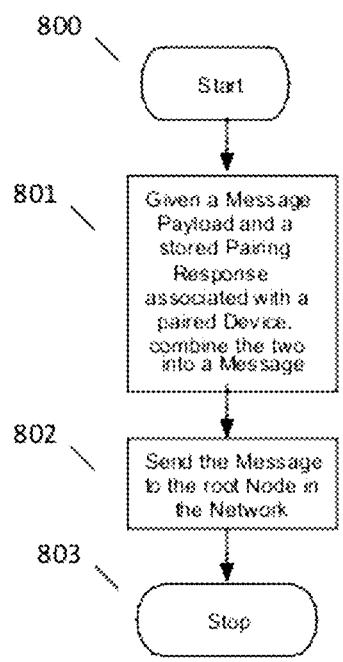
FIG. 8a is a flowchart depicting an exemplary embodiment of a process for messaging executed by an IP-enabled device.

The flowchart in FIG. 8a depicts a process for messaging executed by an IP-enabled device according to an exemplary embodiment of the present invention. The process starts in step 800. In step 801, given a Message Payload 563 and a stored Pairing Response 510 associated with a paired device, the IP-enabled device may combine the two into a Message 560 consisting of a Sender Device Token 561, Receiver Device Token 562, and Message Payload 563. In step 802, the IP-enabled device may send the message to the gateway server (i.e., root node) in the network and the process stops 803.

Figure 8B:
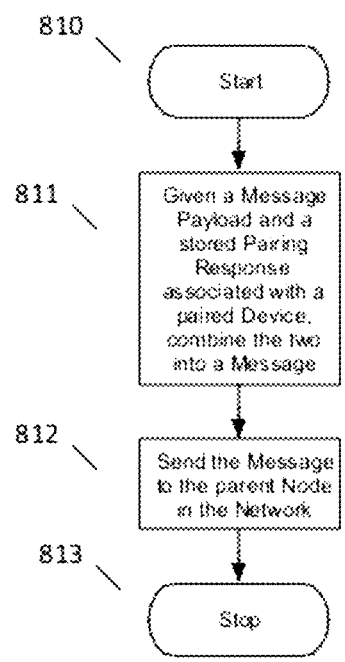
FIG. 8b is a flowchart depicting an exemplary embodiment of a process for messaging executed by a target CPE according to the present invention.
Figure 8E:
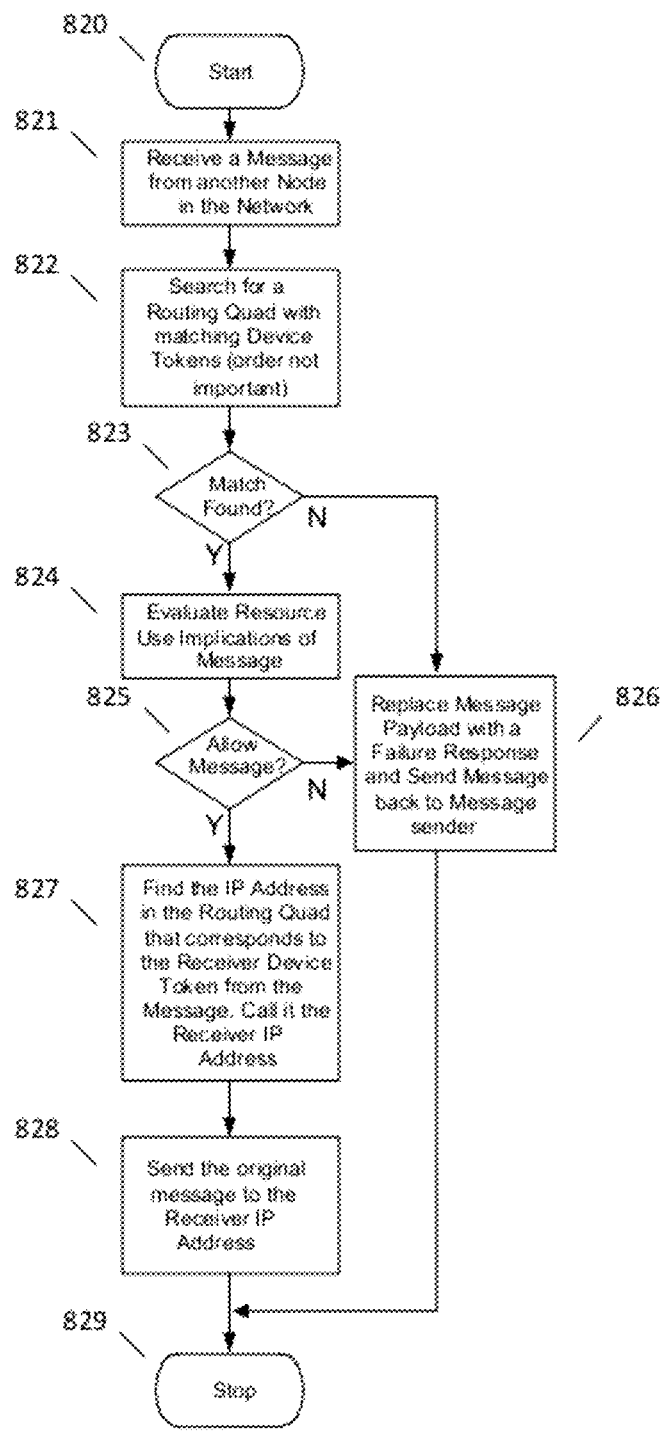
FIG. 8c is a flowchart depicting an exemplary embodiment of a process for messaging executed by gateway servers and distribution and routing servers according to the present invention.

The flowchart in FIG. 8b depicts a process for messaging executed by a target CPE according to an exemplary embodiment of the present invention. The process starts in step 810. In step 811, given a Message Payload 563 and a stored Pairing Response 510 associated with a paired device, the target CPE may combine the two into a Message 560 consisting of a Sender Device Token 561, Receiver Device Token 562, and Message Payload 563. Then, in step 812, the target CPE may send the message to its parent message routing and relay service node (i.e., parent node) in the network and the process stops 813.

The flowchart in FIG. 8c depicts a process for messaging executed by gateway servers and routing and distribution servers (i.e., non-terminal nodes) according to an exemplary embodiment of the present invention. The process starts in step 820. In step 821, the non-terminal nodes may receive a Message 560 from another node in the network. In step 822, the non-terminal node may search for a stored Routing Quad 550 with Device Tokens (551 and 552) matching Device Tokens (561 and 562) in the received Message 560. According to an exemplary embodiment, the order of the matching tokens may be arranged in any way. If matching device tokens are found as indicated in step 823 (Match Found?=Y), step 824 may be executed wherein the non-terminal node may evaluate the resource use implications (e.g., network bandwidth implications) of the message. If, in step 825, the message is allowed (Allow Message?=Y), step 827 may be executed wherein the non-terminal node may find the IP Address (553 or 554) in the Routing Quad 550 that corresponds to the Receiver Device Token 562 from the Message 560. In step 828, the non-terminal node may send the original Message 560 to the node having the IP Address found in the previous step and the process stops 829. Returning to steps 823 and 825, if either test is false (Match Found?=N and Allow Message?=N respectively), processing may continue with step 826 wherein the non-terminal node may replace the Message Payload 563 with a Failure Response, the Message 560 may be returned to the message sender, and processing stops 829.

Exemplary mechanisms may be provided to assure that only certain companion applications 102 will run in systems according to the present invention. Such mechanisms may assure that only companion applications that are authorized to run and authenticated by a system authority, such as a cable company or other multiple services operator, for example, are supported. Such provisioning may be important to limit IP network 115 traffic to acceptable levels, prevent unauthorized applications from negatively impacting customers and network components, and allowing greater overall control by the system authority. Access tokens utilizing key-signing methods may be provided to identify network traffic. Such tokens may include attributes identifying who the application provider is, what days and times a given application is authorized to run, and what associated TV channels and programs a companion application can be associated with. The network management component 113 of the gateway server 110 or the companion application client 132 of the target CPE 130 may be configured to filter out messages that are unauthenticated or unauthorized.

To avoid excessive traffic in the IP network 115 various mechanisms known to practitioners of the art may be implemented such as message compression, design of companion applications 102 to minimize messaging with paired devices (e.g., do as much processing as possible on the device itself 100 and on application servers connected to the main IP network 115), and design of companion applications 115 to gracefully handle messages that may be dropped due to network congestion or other errors. Other mechanisms may include: (a) Configuring the gateway server 110 to intelligently balance and filter messages from all connected device (e.g., filter out messages for devices that are not currently active), and (b) Transforming point-to-point messages to broadcast messages for applications where the same messages are being sent between many different paired devices 100, 130 (e.g., voting and polling).

Exemplary mechanisms for adding additional security to the device pairing and messaging methods may include encryption provided by the network management function (113, 213) of the gateway server (110, 210, 300).

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

The invention claimed is:

1. A method for providing companion services to customer premises equipment using an IP-enabled device, the method comprising:
    pairing the IP-enabled device to the customer premises equipment, via a network running Internet Protocol, using a centralized gateway server, wherein the pairing comprises:
        displaying a pairing code at the customer premises equipment;
        inputting, at the IP-enabled device, a user entry reflecting the pairing code;
        transmitting to the centralized gateway server, from the IP-enabled device and the customer premises equipment, pairing information, wherein the pairing information includes the pairing code;

determining, at the centralized gateway server, that the pairing code received from the IP-enabled device corresponds to the pairing code received from the customer premises equipment; and linking, at the centralized gateway server, the customer premises equipment with the IP-enabled device; and providing web services to the IP-enabled device using the centralized gateway server, wherein the web services define a set of functions accessible to applications running on the IP-enabled device such that the web services are used by the IP-enabled device and executed on the customer premises equipment to provide companion services that are in addition to pre-existing functions provided by the customer premises equipment, wherein at least one of the applications running on the IP-enabled device is configured to display text and/or graphics over video that is playing on a TV screen.

2. The method of claim 1, wherein the customer premises equipment is a set-top box, television, advanced television, digital video recorder, stereo, home security system, home appliance, utility metering device, utility control device, industrial controller, vending machine, remote-controlled vehicle, or robot.

3. The method of claim 1, wherein the IP-enabled device is a tablet computer, smart phone, PDA, laptop computer, desktop computer, kiosk, or set-top box.

4. The method of claim 1, wherein the network is a hybrid fiber-coax (HFC) distribution network, satellite TV network, broadcast TV network, cell phone network, the internet, or an intranet.

5. The method of claim 1, wherein the centralized gateway server is configured to authenticate devices.

6. The method of claim 1, wherein the centralized gateway server is configured to authorize applications.

7. The method of claim 1, wherein the centralized gateway server is configured to manage network resources.

8. The method of claim 1, wherein the centralized gateway server is configured to facilitate a secure transmission of messages between the IP-enabled device and the customer premises equipment.

9. The method of claim 1, wherein the centralized gateway server is configured to provide enhanced television (ETV) services.

10. The method of claim 1, wherein the centralized gateway server is configured to route and relay messages to a plurality of distribution and routing servers, wherein the plurality of distribution and routing servers cooperatively provide a path through the IP network for delivering messages between paired IP-enabled devices and customer premises equipment.

11. The method of claim 1, wherein the companion services are enabled using a companion application client running on the customer premises equipment.

12. The method of claim 1, wherein the application running on the IP-enabled device is configured to:

change a television channel on the customer premises equipment;

query a current channel, program, or state of a set-top box;

begin immediate DVR recording;

schedule future DVR recording;

turn a set-top box on or off;

identify EBIF applications available on a set-top box;

launch EBIF applications available on a set-top box; or communicate with enhanced EBIF applications available on a set-top box.

13. The method of claim 1, wherein the text and/or graphics displayed over video on the TV screen by the at least one application is simultaneously displayed on the IP-enabled device by the at least one application.

14. The method of claim 10, wherein the path comprises:
the centralized gateway server positioned at a root node;
message routing and relay services at one or more intermediate nodes; and
the customer premises equipment at one or more leafs.

15. The method of claim 11, wherein the companion application client is implemented using the enhanced TV binary interchange (EBIF) standard and supported by an EBIF user agent.

16. A system for providing companion services to customer premises equipment using an IP-enabled device, the system comprising:

an IP-enabled device;

customer premises equipment;

a centralized gateway sever, wherein the gateway server pairs the IP-enabled device and the customer premises equipment via a network running Internet Protocol, and wherein the pairing comprises:

displaying a pairing code at the customer premises equipment;

inputting, at the IP-enabled device, a user entry reflecting the pairing code;

transmitting to the centralized gateway server, from the IP-enabled device and the customer premises equipment, pairing information, wherein the pairing information includes the pairing code;

determining, at the centralized gateway server, that the pairing code received from the IP-enabled device corresponds to the pairing code received from the customer premises equipment; and linking, at the centralized gateway server, the customer premises equipment with the IP-enabled device;

wherein the centralized gateway server is configured to provide web services to the IP-enabled device, the web services defining a set of functions accessible to applications running on the IP-enabled device such that the web services are used by the IP-enabled device and executed on the customer premises equipment to provide companion services that are in addition to pre-existing functions provided by the customer premises equipment, wherein at least one of the applications running on the IP-enabled device is configured to display text and/or graphics over video that is playing on a TV screen.

17. The system of claim 16, wherein the customer premises equipment is a set-top box, television, advanced television, digital video recorder, stereo, home security system, home appliance, utility metering device, utility control device, industrial controller, vending machine, remote-controlled vehicle, or robot.

18. The system of claim 16, wherein the IP-enabled device is a tablet computer, smart phone, PDA, laptop computer, desktop computer, kiosk, or set-top box.

19. The system of claim 16, wherein the network is a hybrid fiber-coax (HFC) distribution network, satellite TV network, broadcast TV network, cell phone network, the internet, or an intranet.

20. The system of claim 16, wherein the centralized gateway server is configured to authenticate devices.

21. The system of claim 16, wherein the centralized gateway server is configured to authorize applications.

22. The system of claim 16, wherein the centralized gateway server is configured to manage network resources.

23. The system of claim 16, wherein the centralized gateway server is configured to facilitate a secure transmission of messages between the IP-enabled device and the customer premises equipment.

24. The system of claim 16, wherein the centralized gateway server further provides enhanced television (ETV) services.

25. The system of claim 16, wherein the centralized gateway server is configured to route and relay messages to a plurality of distribution and routing servers, wherein the plurality of distribution and routing servers cooperatively provide a path through the IP network for delivering messages between paired IP-enabled devices and customer premises equipment.

26. The system of claim 16, wherein the companion services are enabled using a companion application client running on the customer premises equipment.

27. The system of claim 16, wherein the application running on the IP-enable device is configured to:

change a television channel on the customer premises equipment;
query a current channel, program, or state of a set-top box;
begin immediate DVR recording;
schedule future DVR recording;
turn a set-top box on or off;
identify EBIF applications available on a set-top box;
launch EBIF applications available on a set-top box; or
communicate with enhanced EBIF applications available on a set-top box.

28. The system of claim 25, wherein the path comprises:
the centralized gateway server at a root node;
message routing and relay services at one or more intermediate nodes; and
the customer premises equipment at one or more leafs.

29. The system of claim 26, wherein the companion application client is implemented using the enhanced TV binary interchange (EBIF) standard and supported by an EBIF user agent.

* * * * *